(12) United States Patent
Marwali et al.

(10) Patent No.: US 12,323,040 B2
(45) Date of Patent: Jun. 3, 2025

(54) CURRENT SENSOR COMPENSATION

(71) Applicant: Rivian IP Holdings, LLC, Plymouth, MI (US)

(72) Inventors: Mohammad Nanda Rahmana Marwali, Irvine, CA (US); Yanjun Shi, Torrance, CA (US); Zahra Mohajerani, Los Angeles, CA (US); Vishnu Mohan, Long Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 207 days.

(21) Appl. No.: 18/067,757

(22) Filed: Dec. 19, 2022

(65) Prior Publication Data

US 2024/0204642 A1     Jun. 20, 2024

(51) Int. Cl.
*H02M 1/00* (2007.01)
*B60L 53/22* (2019.01)

(52) U.S. Cl.
CPC ........... *H02M 1/0009* (2021.05); *B60L 53/22* (2019.02); *H02M 1/0025* (2021.05)

(58) Field of Classification Search
CPC .... H02M 1/0009; H02M 1/0025; B60L 53/22
See application file for complete search history.

(56) References Cited

U.S. PATENT DOCUMENTS

| | | | | |
|---|---|---|---|---|
| 2005/0281067 A1* | 12/2005 | Deng | ................ | H02M 7/53875 363/131 |
| 2009/0244937 A1* | 10/2009 | Liu | ........................ | H02M 7/217 363/46 |
| 2024/0258903 A1* | 8/2024 | Wilson | ................ | H02M 7/5395 |

\* cited by examiner

*Primary Examiner* — Kyle J Moody
(74) *Attorney, Agent, or Firm* — Foley & Lardner LLP

(57) ABSTRACT

Current sensor compensation is provided. A system can include a charger for an electric vehicle having one or more controllers. A controller can amplify an input signal at a selected frequency to generate a first signal. A controller can amplify a direct current component of the input signal to generate a second signal. A component of the charger can generate a reference signal for input into a current sensor of the charger. The reference signal can be based on a combination of the first signal and the second signal.

20 Claims, 11 Drawing Sheets

CURRENT SENSOR COMPENSATION

INTRODUCTION

Electric systems, such as electric vehicles, can contain alternating current (AC) and direct current (DC) components. This technical solution is applicable to devices including power converters processing the AC and DC components.

SUMMARY

Aspects of this technical solution can be applied to, for example, a control circuit for an AC to DC converter. The control circuit can be included in or interface to an AC to DC converter. The AC to DC converter can include current sensors to control the AC to DC converter. The current sensors can detect an AC current. However, a DC offset present in the AC current sensors can cause the AC signal to include a DC value, which can result in resistive losses through resistive components of the AC to DC converter, or saturation or other asymmetries in magnetic components of the AC to DC converter. Such losses or asymmetries can impose ripple on a DC output of the AC to DC converter. A controller can include a time domain controller such as a proportional integral (PI) controller and a frequency domain controller such as a proportional-resonance (PR) controller. The PR controller can operate at a known frequency of the imposed ripple, which can reduce or eliminate the ripple. The reduction of the ripple can eliminate the DC content of the AC current. The PI controller can respond to time-variant stimuli such as a DC level of the DC link. Thusly, any errors associated with the current sensors can be reduced or eliminated.

At least one aspect is directed to a system. The system can include a charger for an electric vehicle having one or more controllers. The controllers can amplify an input signal at a selected frequency to generate a first signal. For example, the first signal can be a PR controller of an outer control loop to output to generate a signal responsive to a detected ripple (e.g., at a fundamental frequency of an AC input to a AC to DC converter). The controllers can amplify a direct current component of the input signal to generate a second signal. For example, the second signal can be a PI controller of the outer control loop to output to adjust a time-variant DC level of a DC link of the AC to DC converter. The charger can include a component to generate a reference signal for input into a current sensor of the charger. The reference signal can be based on a combination of the first signal and the second signal. For example, the reference signal can be applied to a current controller of an inner control loop to adjust an output current of the current controller.

At least one aspect is directed to a method. The method can include amplifying, by one or more controllers of a charger for an electric vehicle, an input signal at a selected frequency to generate a first signal. For example, the first signal can be a PR controller of an outer control loop to output to generate a signal responsive to a detected ripple (e.g., at a fundamental frequency of an AC input to a AC to DC converter). The method can include amplifying, by the one or more controllers, a direct current component of the input signal to generate a second signal. For example, the second signal can be a PI controller of the outer control loop to output to adjust a time-variant DC level of a DC link of the AC to DC converter. The method can include generating, by a component of the charger, based at least in part on a combination of the first signal and the second signal, a reference signal for input into a current sensor of the charger. For example, the reference signal can be applied to a current controller of an inner control loop to adjust an output current of the current controller.

At least one aspect is directed to a system. The system can include a charger for an electric vehicle. The charger can include a first controller to convert an input power signal to a first output power signal with a gain greater than 1 (e.g., greater than 10, 100, or 1000) at a selected frequency. The charger can include a second controller to convert a direct current component of the input power signal to a second output power signal with a gain greater than 1 (e.g., greater than 10, 100, or 1000). The system can include a combiner to combine the first output power signal with the second output power signal to generate a third output power signal to provide a reference signal for input into a current sensor of the charger.

At least one aspect is directed to a system. The system can include a charger for an electric vehicle. The charger can include a first controller. The first controller can receive an input power signal. The first controller can convert the input power signal to a first output power signal with a gain greater than 1 (e.g., greater than 10, 100, or 1000) at a first frequency that is greater than zero. The charger can include a second controller. The second controller can receive the input power signal. The second controller can convert the input power signal to a second output power signal with a gain greater than 1 (e.g., greater than 10, 100, or 1000) at a second frequency that is zero. The charger can include a combiner component to combine the first output power signal with the second output power signal to generate a third output power signal. The third output power signal can provide a reference signal for input into a current sensor of the charger.

At least one aspect is directed to a method. The method can include receiving an input power signal. The input power signal can be received by a first controller. The method can include converting the input power signal to a first output power signal with a gain greater than 1 at a first frequency that is greater than zero. The conversion can be performed by the first controller. The method can include receiving the power input signal by a second controller. The second controller can convert the input power signal to a second output power signal with a gain greater than 1 at a second frequency that is zero. The method can include combining the first output power signal with the second output power signal to generate a third output power signal. A combiner component can combine said signals. The method can include providing a reference signal for input into a current sensor. The reference signal can be based on the combination of the first output power signal and the second output power signal.

At least one aspect is directed to a system. The system can include a first controller. The first controller can receive an input power signal. The first controller can convert the power input signal to a first power output signal with a gain greater than 1 (e.g., greater than 10, 100, or 1000) at a first frequency that is greater than zero. The system can include a second controller. The second controller can receive the input power signal. The second controller can convert the input power signal to a second output power signal with a gain greater than 1 (e.g., greater than 10, 100, or 1000) at a second frequency that is zero. The system can include a combiner component. The combiner component can combine the first output power signal with the second output power signal to generate a third power output signal. The third power output signal can provide a reference signal for an input into a current sensor.

At least one aspect is directed to a system. The system can convert alternating current to direct current power to charge an electric vehicle. The system can include one or more voltage controllers of a charger. The voltage controllers can be configured to amplify an input signal at a selected frequency to generate a first signal. The voltage controllers can be configured to amplify a direct current component of the input signal to generate a second signal. The system can include a component of the charger configured to generate a first reference signal for input into one or more current controllers of the charger. The first reference signal can be based at least in part on a combination of the first signal and the second signal. The system can include a current sensor to generate a second reference signal for input into the one or more current controllers.

At least one aspect is directed to a method. The method can include amplifying, by one or more voltage controllers of a charger for an electric vehicle, an input signal at a selected frequency to generate a first signal. The method can include amplifying, by the one or more voltage controllers, a direct current component of the input signal to generate a second signal. The method can include generating, by a component of the charger, a first reference signal for input into one or more current controllers of the charger. The first reference signal can be based at least in part on a combination of the first signal and the second signal. The method can include generating, by a current sensor, a second reference signal for input into the one or more current controllers.

At least one aspect is directed to a system. The system can include a charger for an electric vehicle. The charger can include a first voltage controller to convert an input power signal to a first output power signal with a gain greater than 1 (e.g., 10, 100, or 1000) at a selected frequency. The charger can include a second voltage controller to convert a direct current component of the input power signal to a second output power signal with a gain greater than 1 (e.g., 10, 100, or 1000). The charger can include a combiner to combine the first output power signal with the second output power signal to generate a third output power signal to provide a first reference signal for input into one or more current controllers of the charger. The system can include a current transformer to generate a second reference signal for input into the one or more current controllers.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
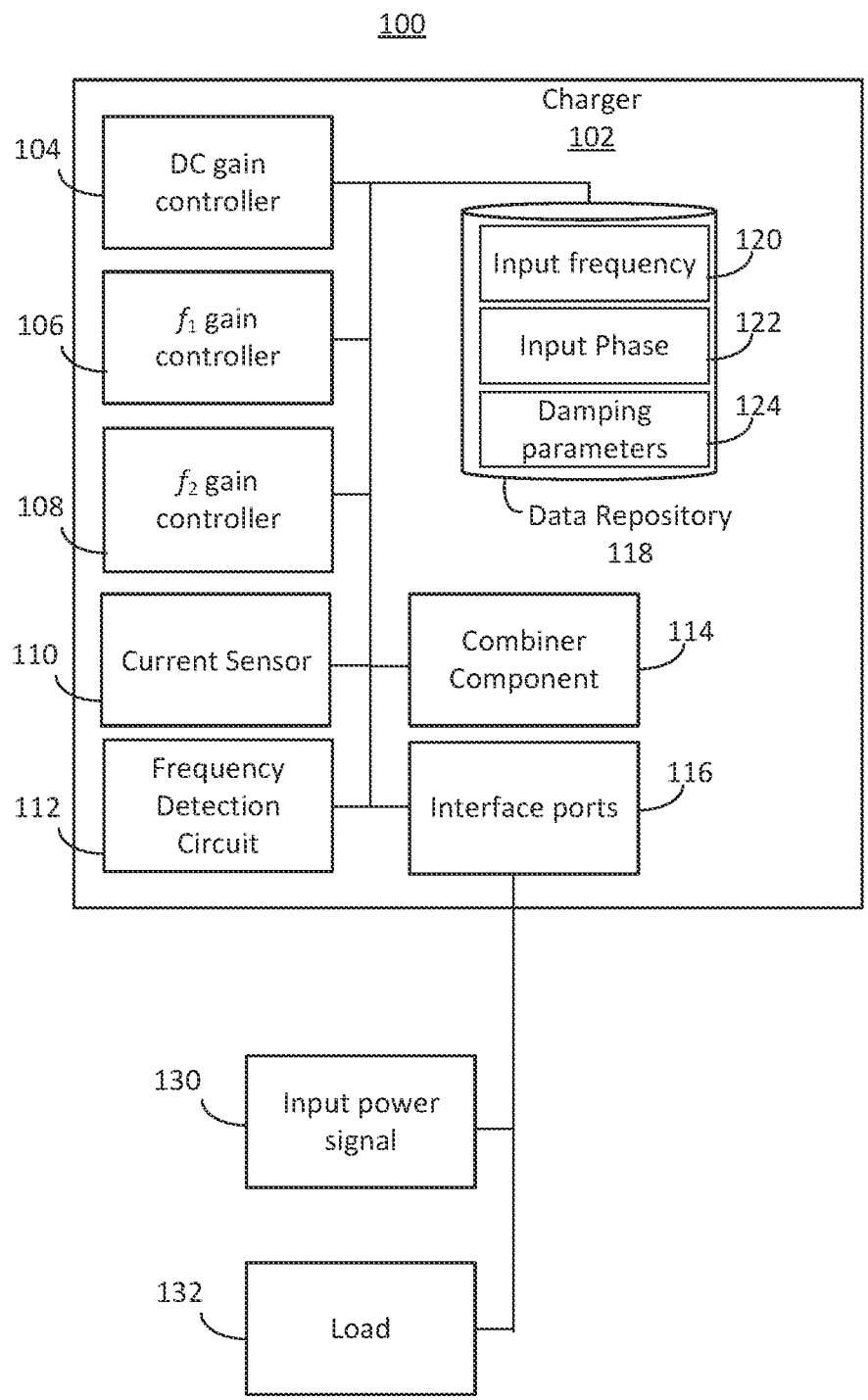
FIG. 1 depicts a system including a charger interfacing with an input power signal or a load, in accordance with some aspects.

Following below are more detailed descriptions of various concepts related to, and implementations of, methods, apparatuses, and systems of current sensor compensation. The various concepts introduced above and discussed in greater detail below may be implemented in any of numerous ways.

This disclosure is directed to systems and methods of current sensor compensation. For example, the systems and method can be applied to AC to DC converters. The technology can detect an AC component of a waveform associated with an AC or DC component of the waveform or another waveform. For example, an AC current sensor can detect an AC signal (e.g., a magnitude, phase angle, or frequency thereof). The detected AC signal can vary according to a resolution, calibration, or accuracy of the AC current sensor. A control circuit can include a plurality of controllers to adjust one more control signals, responsive to the detected AC signal. For example, a first controller can include a proportional-integral controller to adjust a DC set point based on a time-variant control and a detected time averaged voltage, and one or more time-invariant proportional-resonance controllers to adjust the DC set-point based on an AC signal (e.g., an AC signal which is not monitored by a DC sensor). The proportional-resonance controller can have one or more poles, such as poles corresponding to a input power frequency and harmonics thereof. The respective outputs of the controllers can be combined to form an output power signal which can, in turn, reduce the detected AC signal.

The disclosed solutions can have a technical advantage of high gain (e.g., greater than 1) at frequencies of interest (such as DC signals, low frequency signals, or one or more additional frequencies of interest, such as a known interference frequency which may arise from a difference between an input signal and a detected input signal). The disclosed solutions can benefit from the use of current sensors which does not detect DC component, where current sensors which detect both AC and DC component might otherwise be employed (e.g., where a DC state can be inferred based on an AC component of one or more portions of a circuit). Such sensors can be, for example, more reliable, lower cost, share components with other system components, or be more readily connected. The disclosed solutions can reduce an AC component or other oscillating component of a signal which can reduce power efficiency or quality or the ability to accurately or reliably measure current, such as during the charging of an electric vehicle. Such AC components can also increase a voltage above a desired value.

Systems and methods of the present technical solution can include a charging station (e.g., for an electric vehicle), an energy storage device (such as a battery assembly), a motor or other drive controller, and other systems including a DC link which can be proximate to, derived from, provide energy to, or otherwise associated with an AC signal (such as a rotating mechanical device or a power grid).

FIG. 1 depicts an example system 100 to provide output power to a load 132, in accordance with some aspects. The system 100 can include, interface with, or otherwise communicate with one or more input power signals 130. The system 100 can include, interface with, or otherwise communicate with one or more loads 132. In some cases, the charger 102 can be referred to as or include a data processing system. The charger 102, or devices associated with the input power signal 130 or load 132 can communicate via a network. The network can include computer networks such as the Internet, local, wide, metro, or other area networks, intranets, cellular networks, satellite networks, and other communication networks such as voice or data mobile telephone networks.

The charger 102 can include at least one DC gain controller 104. The charger 102 can include at least one $f_1$ gain controller 106. The charger 102 can include at least one $f_2$ gain controller 108. The charger 102 can include at least one current sensor 110. The charger 102 can include at least one frequency detection circuit 112. The charger 102 can include at least one combiner component 114. The charger 102 can include at least one interface port 116. The charger 102 can include at least one data repository 118.

The DC gain controller 104, $f_1$ gain controller 106, $f_2$ gain controller 108, current sensor 110, frequency detection circuit 112, combiner component 114, or interface port 116 can each include at least one processing unit or other logic device such as a programmable logic array engine, or a module configured to communicate with the data repository 118 or database. The DC gain controller 104, $f_1$ gain controller 106, $f_2$ gain controller 108, current sensor 110, frequency detection circuit 112, combiner component 114, or interface port 116 can be separate components, a single component, or part of the charger 102. The charger 102 can include hardware elements, such as one or more processors, logic devices, or circuits. For example, the charger 102 can include one or more components or structures of functionality of the computing device depicted in FIG. 11.

The data repository 118 can include one or more local or distributed databases, and can include a database management system. The data repository 118 can include computer data storage or memory and can store one or more of an input frequency 120, an input phase 122, and a damping parameter 124. The input frequencies 120 can include frequency data for one or more inputs or one or more phases of inputs such as an expected frequency, a detected frequency, or an averaged frequency. The input phases 122 can include phase data of one or more phases of an input. For example, a phase relationship between or within one or more inputs, or a phase position of one or more of the phases thereof. The damping parameters 124 can include one or more parameters for a controller to adjust the damping rate, frequency, or amount, such as the proportional gain, integral gain, derivative gain, or loop interval time of a controller.

Still referring to FIG. 1, the charger 102 can include at least one DC gain controller 104 designed, constructed or operational to provide a gain at a DC state. A gain can refer to increasing the power or amplitude of an input signal to generate or an output signal that has a greater power or amplitude than the input signal, for example. The DC gain controller 104 can provide a gain for a DC signal, such as a DC link of an electric vehicle, an energy storage device (e.g., comprising a battery), or a ground signal. Put differently, the DC gain controller 104 can provide an amplification of an input signal. The DC gain controller 104 can control an outer loop of an AC to DC converter. The amplification can be of an opposite magnitude such that the amplified signal, in combination with a input signal, reduces a deviation from a target voltage. For example, the input signal can indicate a difference between a target voltage and a time averaged (e.g., integrated over time) detected voltage. The amplification can be rate limited such as according to a damping parameter 124. An input signal can be a difference between a DC link nominal voltage and a DC link detected voltage (e.g., an average of an integral over a trailing period). For example, an input signal can be −10 volts based on a nominal voltage of 400 volts, and a measured voltage of 390 volts. The DC gain controller 104 can increase the voltage to, for example, 405 volts before converging to 400 volts, according to the damping parameters 124.

The DC gain controller 104 can provide a DC gain of an AC signal, such as a sinusoidal AC signal centered about a DC value (e.g., a zero or non-zero value). The DC gain controller 104 can be a voltage follower or a proportional-integral-derivative (PID) controller, such as a proportional-integral (PI) controller. The DC gain controller 104 can receive an input power signal, such as a signal indicating a difference between an undisturbed output signal and disturbed output signal. The input power signal can include an output voltage or a proportional depiction thereof, a PWM signal, or another reference to the output voltage (e.g., a variable or other representation of the output signal). The input power signal can include a reference signal indicating an expected, desired, or undisturbed output voltage. For example, the input power signal can be or refer to a difference between the output signal and the reference signal (e.g., can be zero where the output signal is undisturbed or greater than one wherein a output is disturbed or otherwise indicative of a condition susceptible to correction).

The DC gain controller 104 can convert the input power signal to an output power signal. The output power signal can be a time-invariant output signal (such as a value based on a lookup table) based on the real-time state of the input power signal. The output power signal can be a time-variant signal such as an output of a PI controller. For example, the output power signal can depend on the past output power signal or input power signal 130 (e.g., based on a derivative or integral thereof, or another damping parameter 124).

The gain of the DC gain controller 104 can vary according to the input signal. For example, the gain can be greater than one at a frequency of zero. The gain can refer to the magnitude of the gain applied by the controller. For example, the gain can be responsive to a detected signal which is above or below a reference value or a threshold. Thus, the gain can be a positive gain or a negative gain (e.g., according to an architecture of the DC gain controller 104 and other associated components, such as the presence of inverting or non-inverting components). The gain of the DC gain controller 104 or other components herein can refer to the magnitude or absolute value of the negative or positive gain.

The charger 102 can include an $f_1$ gain controller 106 designed, constructed or operational to convert an input power signal to an output power signal. For example, the $f_1$ gain controller 106 can receive the same input power signal as the DC gain controller 104, or a variant thereof (e.g., the input power signal can be filtered for the $f_1$ gain controller 106 or other components herein). Put differently, the $f_1$ gain controller 106 can operate in parallel to the DC gain controller at an outer control loop of the AC to DC converter. The $f_1$ gain controller 106 can provide a gain that peaks at a frequency (e.g., a pole) associated with a targeted frequency (e.g., $f_1$). A pole can refer to a frequency at which a first derivative of the transfer function of the $f_1$ gain controller 106 (or another controller) equals zero. For example, the pole can refer to a local minimum or local maximum of the transfer function or circuit associated therewith. The targeted frequency can be a non-zero frequency. The targeted frequency can be based on a frequency received from the frequency detection circuit 112. For example, the targeted frequency can be the frequency detected by the frequency detection circuit, or be derived therefrom (e.g., can be offset from or proportional to, such as an integer multiple of). The $f_1$ gain controller 106 can have a discrete (e.g., defined by a table) or continuous (e.g., defined by a function) transfer function based on the magnitude or frequency of the input signal or a frequency determined based on the frequency detection circuit 112. For example, in a mono-pole $f_1$ gain controller 106, the response can peak at the target frequency (e.g., such as a gain of greater than 1, 100, or 1,000), and the response can be lesser at frequencies greater or lesser than the target frequency (e.g., monotonically downward away from the target frequency). The transfer function can be linearly or logarithmically symmetrical (e.g., the transfer function can drop off from the peak linearly as viewed on a logarithmic or linear depiction, such as in FIG. 6 or 7).

The $f_1$ gain controller 106 can be, include, or interface with a proportional resonance (PR) controller or a pseudo PR controller (e.g., having a damped response curve). For example, the PR controller can include a logical transfer function (e.g., lookup table, discrete function, or other association) which intentionally reduces a gain of the controller or increases a bandwidth. The reduced gain or bandwidth can be intended to, or can actually, increase a stability of the circuit, match one or more non-ideal components of an electrical circuit (e.g., inductances or resistances of transmission lines, capacitances between various components, or gain bandwidth products of amplifiers). The reduced gain or bandwidth can be a result of the various non-ideal parameters of the component (e.g., the PR controller can be associated with a gain which is infinite or otherwise unrealizable for an associated electrical circuit). The frequency response of the $f_1$ controller (or other controllers) can sharply peak about the pole. For example, the gain can be substantially greater than one in a narrow range around a pole frequency.

The charger 102 can include an $f_2$ gain controller 108 designed, constructed or operational to convert an input power signal to an output power signal. For example, the $f_2$ gain controller can receive a target frequency from or derived from a frequency detected by the frequency detection circuit 112. The target frequency of the $f_2$ gain controller 108 can be derived from the target frequency of the $f_1$ gain controller 106. For example, the target frequency of the $f_2$ gain controller 108 can be proportional to the target frequency of the $f_1$ gain controller (e.g., a harmonic, or other multiple thereof). The $f_2$ gain controller 108 can be a monopole controller (e.g., having a single peak at the target frequency), or contain a plurality of poles. The $f_2$ gain controller 108 can include portions to respond to a plurality of frequencies. For example, the $f_2$ gain controller can be an additional instance of the $f_1$ gain controller 106 having a different pole.

As referred to herein, controllers can be referred to in combination or portion as a controller. In some cases, the $f_1$ controller and the $f_2$ controller can be a same type of controller or different types of controllers. The $f_1$ controller and the $f_2$ controller can be a same type of controller, configured with different gains at different frequencies. For example, the $f_1$ gain controller 106 and $f_2$ gain controller 108 can be referred to as a controller or amplifier (e.g., as an $f_{1,2}$ gain controller or amplifier). In a further example, the $f_2$ gain controller 108 can be referred to as two controllers wherein the first controller controls a response to frequencies at or below the target frequency, and the second controller controls a response to frequencies above the target frequency (e.g., $f_{1\_low}$ and $f_{1\_high}$). Controller can be defined according to an implementation scheme, a target signal, or another convention. For example, the $f_1$ gain controller 106 can be associated with the fundamental frequency of an input power signal 130 to mitigate an effect of a DC offset present which cannot be measured by the current sensor which is capable of measuring only AC current signal (e.g., a transformer); the $f_2$ gain controller 108 can be associated with a first harmonic (e.g., a doubling) of the target frequency of the $f_1$ gain controller 106 to mitigate an unbalanced gain error associated with the current sensor which is capable of measuring only AC current signal.

The charger 102 can include current sensors 110 designed, constructed or operational to detect current signals. For example, the charger 102 can include current sensors on one or more phases of an input power signal 130. In existing and prior arts, for the input current controller to function properly, the current sensors 110 must be able to detect both AC and DC components of the input current signal. Therefore, typically current sensor 110 comprises of Hall effect sensors which provide measurement of both AC and DC components. Current sensors such as current transformer (CT) or a Rogowski Coil cannot typically be used in this application since they only provide measurement of AC component of the current. Using the proposed method, however, these types of current sensors which are normally more economical than Hall effect sensors, can be utilized since the DC component of the current will be indirectly inferred by including the $f_1$ gain controller 106 in the DC link voltage controller. The frequency $f_1$ is provided by the frequency detection circuit 112.

The charger 102 can include a frequency detection circuit 112 designed, constructed or operational to detect one or more fundamental frequencies of an input power signal 130. For example, the frequency detection circuit 112 can include a real-time measure of an input frequency such as a phase locked loop (PLL) or digital signal processing (DSP) of a signal such as various filters or transforms. The real-time measurement can be received or derived from a motor controller, such as a motor controller for an electrical generator. Various transmission times, processing operations, or measurement settling times can accrue a lag between a signal and a measurement thereof. A real time measurement can thus include a slight delay, such as a delay of less than one second. The frequency detection circuit 112 can include a user selectable switch (such as to select between 50 Hz or 60 Hz operation), or can include a region based identifier (e.g., to infer a frequency of a power grid based on a region). The frequency detection circuit 112 can include a plurality of sub-circuits to compare, verify, confirm, or vote upon a detected frequency. The frequency detection circuit 112 can detect a sinusoidal signal of various input power signals. The frequency detection circuit 112 can detect a fundamental frequency for a multi-phase signal. For example, the frequency detection circuit 112 can detect the fundamental frequency of a three phase power signal, wherein each phase has a same fundamental frequency such that the three phases maintain a phase relationship therebetween. The frequency detection circuit 112 can detect the frequency or phase of various sinusoidal signals including a sinusoidal signal that is or closely approximates a sine wave, or an alternative thereof (e.g., a saw-tooth wave, a square wave, a stepped sine wave, or another signal type). The frequency detection circuit 112 can detect further frequencies associated with one or more signal types. For example, a frequency detector can detect a fundamental frequency of a stepped sine wave (e.g., a frequency of a sine wave corresponding to the stepped sine wave), a step frequency, or a ripple frequency imposed over the waveform.

The frequency detection circuit 112 can detect a phase of one or more phases of a input power signal 130 or one or more input power signals 130. For example, the PLL can determine the phases. The frequency detection circuit 112 can detect absolute or relational phases. For example, the frequency detection circuit 112 can detect a relationship between the three phases of a power signal (e.g., a 120 degree offset) or the frequency detection circuit 112 can determine a particular phase angle of one or more phases (e.g., 0°) at a particular time or other reference (e.g., in a time or Laplace domain).

The charger 102 can include a combiner component 114 circuit designed, constructed, or operational to generate a reference signal. The combiner component 114 can generate the reference signal based on the combination (e.g., summation, weighted combination, or other incorporation) of the output power signals of one or more controllers (e.g., the DC gain controller 104, $f_1$ gain controller 106, or $f_2$ gain controller 108). The combiner component 114 can generate the reference signal based on the input power signal 130. For example, the combiner component 114 can receive phase, phase angle, phase relationship, or frequency information from the frequency detection circuit 112, and generate the reference signal based on said information. For example, the combiner component can receive a phase angle of an input power signal to scale the reference signal to track the phase angle (e.g., in phase with, leading, lagging, or a multiple of).

The combiner component 114 can include or interface with a current controller to control the current applied to a circuit portion based on the reference signal. For example, the current controller can limit current responsive to the reference signal. The current limit can be applied to an AC or DC circuit. The combiner component 114 can provide a reference signal to a current controller at an inner loop of a control circuit. The provision of the reference signal can cause the current controller to compensate for an AC component detected by the $f_1$ controller 104. For example, the $f_1$ controller 104 can detect ripple based on a DC offset associated with a current sensor communicatively coupled to the current controller.

The current limit can be applied to a DC link of an electric vehicle, a charger (e.g., for an electric vehicle), or an energy storage device. As used herein, a DC link is a circuit node including a DC component. The DC link can be a linking portion between stages of a power conversion circuit (e.g., between an AC-DC or DC-DC conversion stage). For example, the DC link can be between power conversion stages within a charger for an electric vehicle, within the electric vehicle, or along a boundary therebetween (e.g., at an interface port 116 of the charger 102). The combiner component 114 can combine signals according to a sequence of one or more steps resulting in one or more intermediate signals. For example, the combiner component 114 can combine one or more output power signals for one or more controllers (e.g., each signal corresponding to gain peaking at DC, a first frequency, or a second frequency). The combined output power signal can thereafter be combined with a phase angle signal to generate the reference signal.

The combiner component 114 can include or interface with a compensation circuit. The compensation circuit can apply a compensation signal based on the reference signal. For example, the compensation signal can be an analog signal, a PWM signal, or another signal to control current flow. For example, the compensation circuit can include driving a gate to control a current flow or a relay to cease current flow (e.g., latching into an off-state responsive to an over-voltage condition, or for a time slice of a pre-defined duty cycle to maintain a target current or voltage). The combiner signal can deliver feedback to various controllers (e.g., a PR controller and a PI controller) to reduce an output disturbance or AC component, which can increase efficiency, or lower transients or ripple, which can thus eliminate a need for a DC current sensor to detect various offsets or other states which can be detected or inferred based on an AC signal.

The charger 102 can include one or more interface ports 116 designed, constructed or operational to interface with one or more components. For example, the interface port can interface with one or more input power signals 130 or loads 132. The interface port 116 can include circuits to receive or provide power or data. The interface port 116 can exchange data with the load or the input power signal (as used herein, references to data exchanges with the load 132 or the input power signal 130 can be with a device associated with the load 132 or input power signal 130, such as a microcontroller of an electric vehicle or an energy grid).

The input power signal 130 can include various energy sources, which can be controlled, apportioned, or selected by the interface port 116. An input power signal 130 can be received from a power grid, an electric vehicle, a motor/generator, or an energy storage device (e.g., a battery). Input power signals 130 can be received from a plurality of sources. For example, a first input power signal 130 can be received from a first source such as a solar array, a second input power signal 130 can be received from a second source such as an energy storage device, and a third source can be received from an electric power grid. The input power signals 130 can be or include an AC or DC component. For example, the input power signals can be or include a single or multi-phase signal, such as a three phase AC signal. The load 132 can include various energy sinks which can be controlled, apportioned, or selected by the interface port 116. For example, the load 132 can include one or more power grids, electric vehicles, motors/generators, or energy storage devices.

Figure 2:
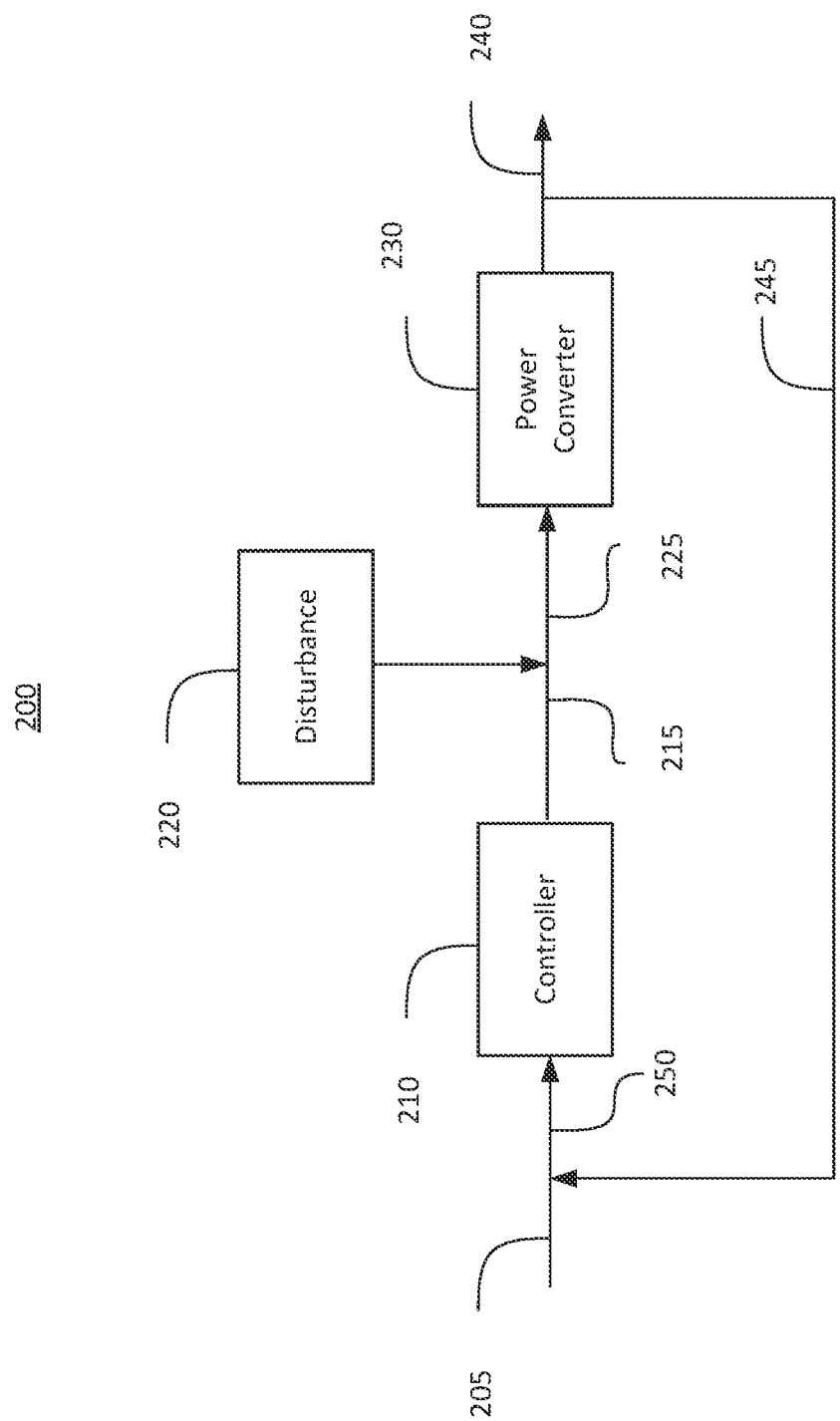
FIG. 2 depicts a control circuit for a controller to adjust an output based on a disturbance, in accordance with some aspects.

FIG. 2 depicts an example control circuit 200 for a controller to adjust an output based on a disturbance 220, in accordance with some aspects. The control circuit 200 can receive a target signal 205 at an input of an interface port 116. The target signal 205 can be received from the combiner component 114, such as directly or through an intermediate component. For example, the target signal 205 can be an input signal for a requested output of the control circuit, or a fixed reference voltage. The control circuit 200 can combine (e.g., sum, delta, multiply, or determine a value based on a weighted factor for each signal) the target signal 205 with a feedback signal 245 to generate an error signal 250. For example, the control circuit 200 can determine the error signal 250 based on a difference between the target signal 205 and the feedback signal 245. The feedback signal 245 can be based on a value detected by the current sensor 110 (e.g., by an AC component of a DC link). The control circuit 200 can determine the error signal 250 based on a scaled value or other representation of one or more of the feedback signal 245 or the target signal 205. For example, the control circuit 200 can receive an indication of an analog value as a digital representation of a signal such as a data structure, PWM signal, or indication of a value meeting one or more thresholds.

A controller 210 can receive the error signal 250. The controller can include one or more poles such as poles associated with a DC state or one or more frequencies. For example, the controller can include one or more of the DC gain controller 104, $f_1$ gain controller 106, or $f_2$ gain controller 108. The controller 210 can provide a reference signal 215 for output. The reference signal 215 can be responsive to one or more disturbances 220 that operate on the reference signal 215, or a signal derived therefrom to generate a disturbed signal 225. For example, the disturbance can be ripple applied to a DC link based on a DC offset associated with a current sensor which is able to measure only AC current signal (e.g., a current transformer). The reference signal 215 can be a control signal such as a gate drive signal to cause a generation of or control of a character of another signal (e.g., can be a control signal for a higher power signal, such as for a power converter 230). Such a control signal or higher power signal can be disturbed by the disturbance 220 to form the disturbed signal 225. The disturbance can originate from an external source such as a sinusoidal signal (e.g., a power signal). The disturbance can originate from an input or output of the controller 210. For example, a DC offset of a signal passed through a transformer, such as a current sensor can distort the signal detected by the current sensor. A distorted detection can result in an asymmetrical current which can manifest as a ripple imposed over a DC signal (e.g., the DC link). The disturbed signal 225 can include one or more narrow band components (e.g., can be a grid frequency centered around 50 Hz or 60 Hz, with little or no detectable signal present 10% above or below the centered frequency), responsive to another frequency of or associated with the circuit. For example, a first portion of the disturbed signal 225 can be a DC disturbance 220. A second portion of the disturbed signal 225 can be associated with a first frequency or frequency band disturbance 220. A third portion of the disturbed signal 225 can be associated with a second frequency or frequency band disturbance 220.

The power converter 230 can output a signal based on one or more input components. For example, the input components can receive signals from the controller 210 that, in combination with the disturbance 220, cause the power converter 230 to generate a circuit output signal 240 having a lesser disturbance than the power converter would, absent the contribution of the controller 210. The control circuit 200 can output the circuit output signal 240, such as to a load 132. A portion of the circuit output signal 240 can be fed back as a feedback signal 245. For example, the feedback signal 245 can be a same signal as the circuit output signal 240, can be proportional to, or otherwise associated with the circuit output signal 240, such that the feedback signal 245 can, in combination with the target signal 205, cause an error signal 250 to be generated for the controller 210.

Figure 3:
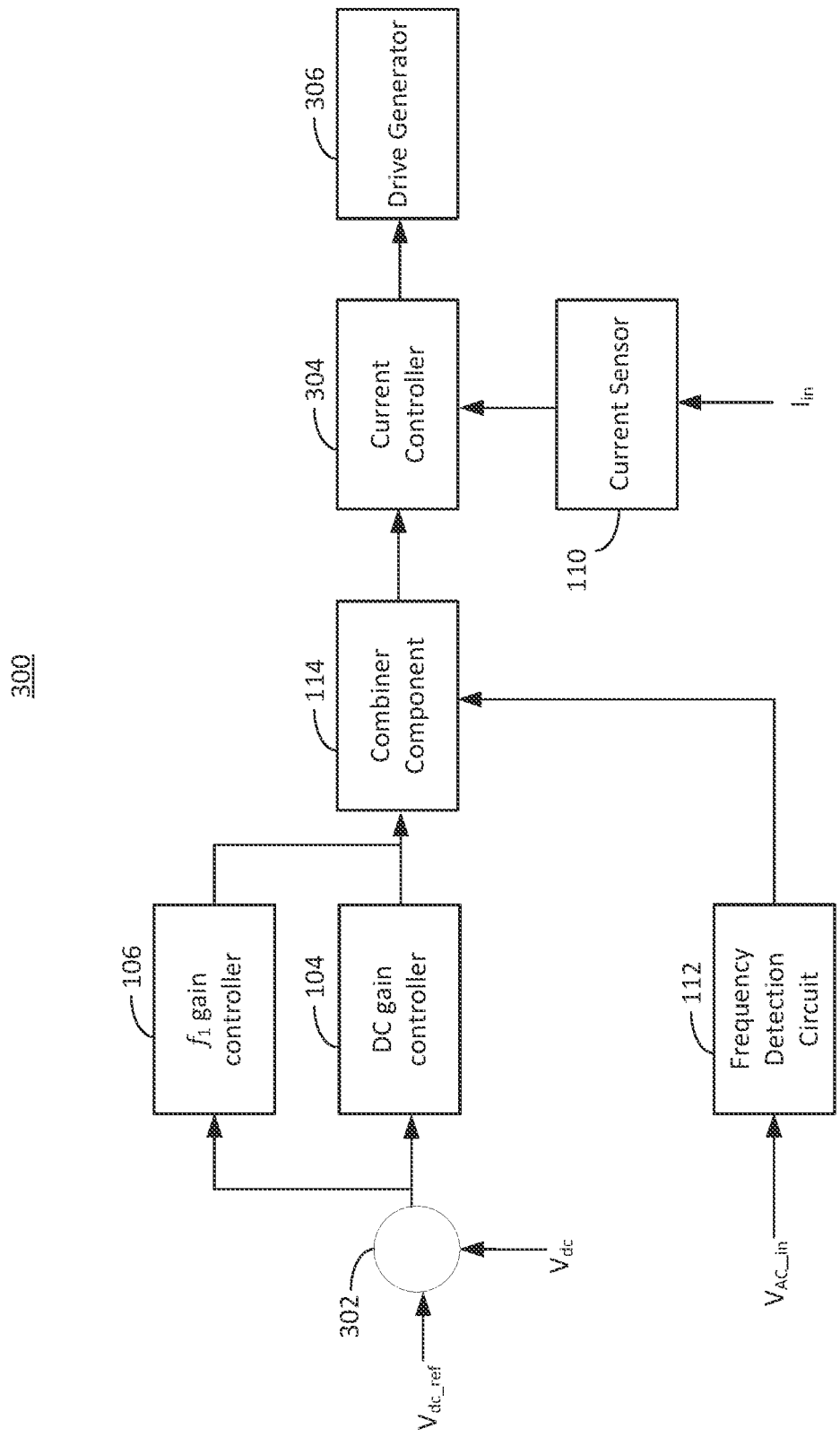
FIG. 3 depicts a circuit of an AC to DC converter including controllers to adjust a gain at a plurality of frequencies, in accordance with some aspects.

FIG. 3 depicts an example circuit of an AC to DC converter 300 including controllers to adjust a gain at a plurality of frequencies, in accordance with some aspects. The AC to DC converter 300 can be or incorporate aspects of the control circuit 200 of FIG. 2. The AC to DC converter 300 includes a comparator 302 to compare a DC reference signal with a measured, detected, or inferred DC signal. For example, the measured, detected, or inferred DC signal can be an output of the AC to DC converter 300, derived therefrom, or an intermediate stage thereof. The comparator 302 output can be provided to a controller. The controller can include a DC gain controller 104 or a non-DC gain controller, such as an $f_1$ gain controller 106 or an $f_2$ gain controller 108. The one or more controllers can be independent or share one or more components.

A combiner component 114 or a controller can combine the outputs of the controllers. For example, the combiner component 114 can sum or otherwise combine the transfer functions of the controllers 104 and 106. The combiner component 114 can process the outputs of the controllers 104 and 106 to avoid interference between the respective transfer functions. For example, a piecewise function can combine the outputs of a plurality of controllers 104 and 106 along respective apportioned frequency ranges (e.g., assigned or determined based on the frequency detection circuit 112 or the controller type). The controllers 104 and 106 can include thresholds to bound the threshold function (e.g., 0 dB, −20 dB, or −40 dB). The combiner component 114 can receive signals including the bounded transfer function or information related to a threshold of the combiner component 114.

The combiner component 114 can combine the signals of an outer control loop based on an output of the frequency detection circuit 112. For example, the combiner component 114 can generate a reference signal 215 in phase with a component (e.g., a fundamental frequency) of an AC signal associated with the circuit (e.g., an input thereto). A current controller 304 of an inner control loop can receive the reference signal 215. The current controller 304 can receive one or more currents of an energy supply. For example, the current controller 304 can include a maximum peak current (e.g., which can be related to a load, a transformer saturation current, or a requested output.) The current controller 304 can include one or more time averaged maximum currents or powers (e.g., for thermal, Hi-pot, or battery management). For example, the combiner component can limit the duty cycle of a circuit element providing power between an input and an output (e.g., a switching transistor).

A drive generator 306 can convert an electric input signal to another output. For example, the drive generator 306 can be or include the power converter 230 of FIG. 2. The drive generator 306 can receive or provide a signal having an AC, DC, or PWM component. The drive generator 306 can include various sensors, feedback signals, or other communicative coupling with other elements of the circuit. The drive generator 306 can operate at a plurality of power, current or voltage levels. For example, the drive generator 306 can operate at several amps/kW/V, several tens of amps/kW/V, several hundreds of amps/kW/V, or several thousands of amps/kW/V. The drive generator 306 can be an inverter, a traction motor of an electric vehicle, or a charging circuit (e.g., to charge a battery of an electric vehicle). The varying power, voltage, or current levels can be associated with varying ripple, tolerance, efficiency, frequency, and the like.

Figure 4:
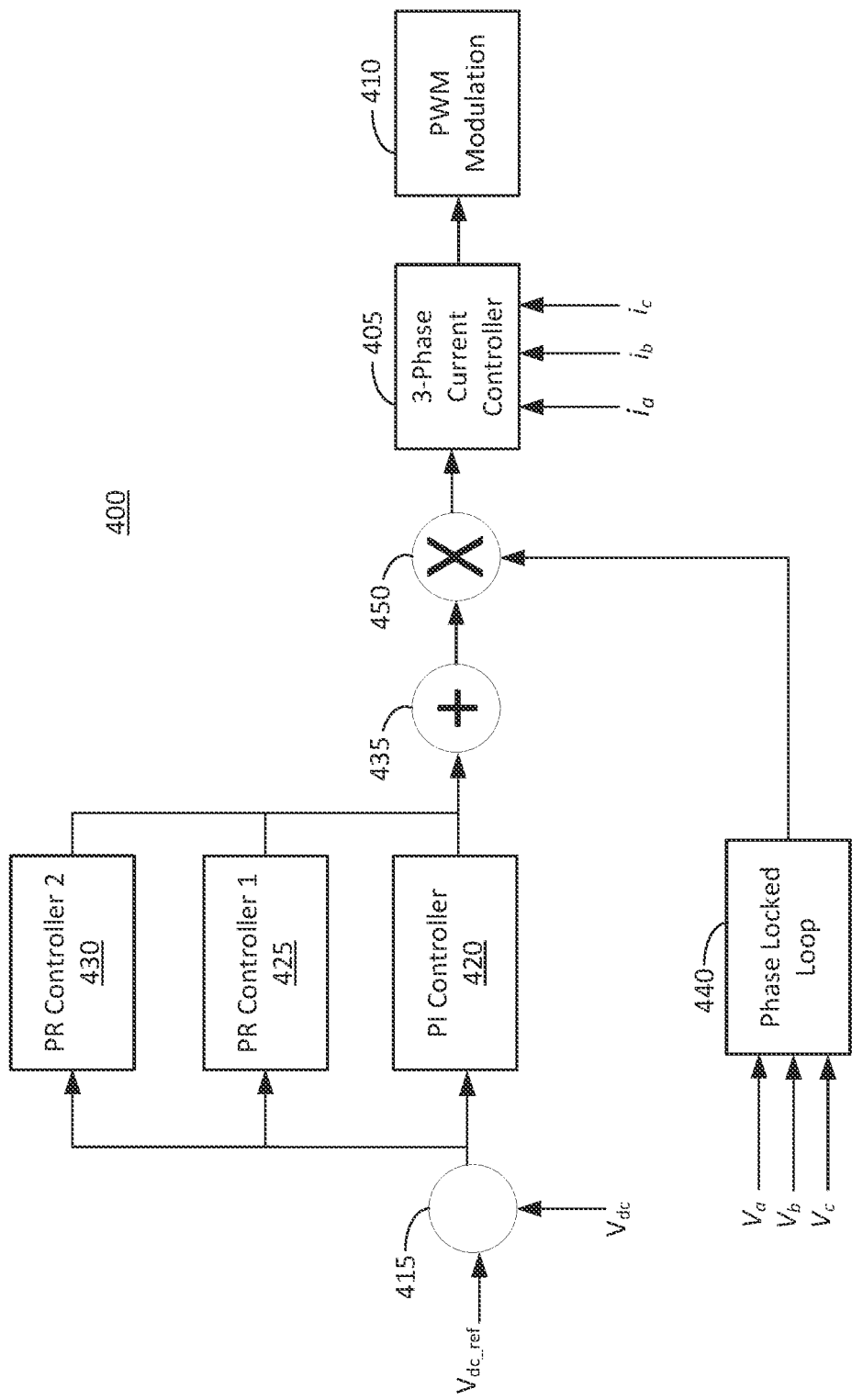
FIG. 4 depicts an example circuit of an AC to DC converter including controllers to adjust a gain at a plurality of frequencies, in accordance with some aspects.

FIG. 4 depicts an example circuit 400 of an AC to DC converter including controllers to adjust a gain at a plurality of frequencies, in accordance with some aspects. The example circuit is not intended to be limiting. Indeed, various circuits having omissions, substitutions, or additions applied thereto can be generated within the scope of the present disclosure. The example circuit 400 can be an AC to DC converter. The 3-phase current controller 405 can receive a current reading from a current transformer (not depicted) for one or more phases (e.g., $i_a$, $i_b$, or $i_c$). The 3-phase current controller 405 can provide an output to a PWM modulation device 410 to generate gate drive signals of an inner control loop to control current passed between a three-phase AC signal of about 60 Hz (e.g., a rectified three-phase AC signal) and a DC signal such as the DC link. The frequency of the three phase AC signal can be detected by according to a frequency detector (not depicted) separate from the depicted phase locked loop 440.

The current transformer (not depicted) can include a variance between a measured current and an actual current. For example, a DC offset error can propagate through the AC to DC converter at a same frequency of the fundamental frequency (e.g., 60 Hz) of the three-phase AC signal. An unbalanced gain between phases of the three-phase AC signal can propagate through the AC to DC converter at a first harmonic of the frequency (e.g., 120 Hz). Thus, according to a variance in measurement, the uncompensated output of the AC to DC converter can include a ripple at a fundamental frequency of 60 Hz, and a first harmonic thereof, 120 Hz. Further, a DC level of the DC link can vary. For example, the DC link voltage can rise incident to regenerative braking, or fall incident to an increase in current sourced by electric motors thereof (e.g., acceleration).

A DC link comparator 415 (e.g., an operational amplifier) can compare a DC link voltage to an expected DC link voltage to generate an error signal. The error signal can include the ripple at the fundamental frequency or the first harmonic thereof. A PI controller 420 of an outer control loop can compensate a DC portion of the error signal. For example, the PI controller 420 can adjust a current limit or other set point for the DC link to converge the voltage of the DC link towards the set point. The PI controller 420 can include various damping parameters 124 (e.g., to avoid oscillations). The damping parameters 124 can be selected to maintain a stability of a DC output level. However, the damping factors can reduce a bandwidth of the PI controller 420. For example, a selection of damping parameters 124 to allow operation of the PI controller 420 at 60 Hz or 120 Hz can lower a stability of a system (e.g., result in excessive oscillations). Thus, damping parameters 124 for the PI controller 420 can be selected which limit the operation of the PI controller 420 to a desired amplification or gain at or below 10 Hz, 1 Hz, or 0.1 Hz.

The first proportional resonance controller 425 and the second proportional resonance controllers 430 can apply respective transfer functions to the error signal at the outer control loop. The transfer function of the first proportional resonance controller 425 can be sharply peaked at about the fundamental frequency of the three phase AC signal. For example, the gain of the first proportional resonance controller 425 can be ten, one hundred, or one thousand at 60 Hz, and can be less than one for frequencies less than 50 Hz or greater than 70 Hz. The transfer function of the second proportional resonance controller 430 can be sharply peaked about the first harmonic of the fundamental frequency of the three phase AC signal. For example, the gain of the second proportional resonance controller 430 can be ten, one hundred, or one thousand at 120 Hz, and can be less than one for frequencies less than 100 Hz or greater than 140 Hz.

Thus, the respective controllers can each apply a transfer function to the error signal at frequency bands of interest. The outputs of the respective controller can be summed by a PI controller-PR controller combiner 435 to generate an aggregated compensation signal. The aggregated compensation signal can be conveyed to the inner control loop including the three-phase current controller 405. For example, the aggregated compensation signal can be provided as scaled based on the phase angle of the three phase AC signal as detected by a phase locked loop 440, by a scaler 450 such as a multiplier.

Figure 5:
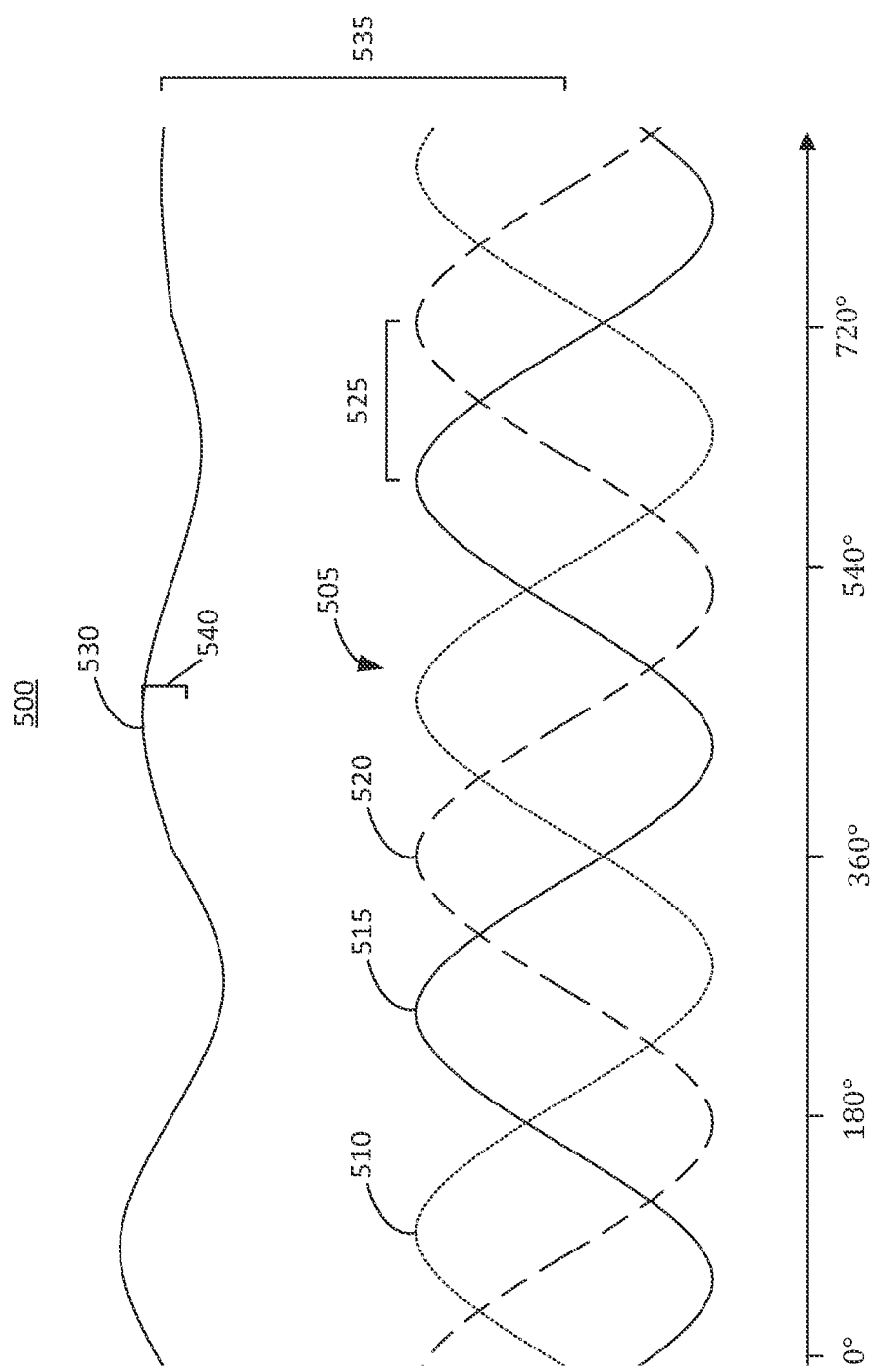
FIG. 5 depicts a waveform of an input and output circuit, in accordance with some aspects.

FIG. 5 depicts a waveform 500 of an input and output of a circuit, in accordance with some aspects. For example, the input can include a three phase sinusoidal signal 505 and the output signal 530 can include or be a DC link signal. The three phase sinusoidal signal 505 can include a first phase 510, a second phase 515, and a third phase 520. One or more phases can be defined by a phase relationship 525. For example, each phase can share a fundamental frequency, or one or more carrier signals (not depicted) such as high frequency ripple or DC drift. The phase relationship 525 (e.g., of the shared fundamental frequency) can be defined according to a phase angle such as 120° or 180°.

An output signal 530 of the circuit can include an intermediate circuit portion such as a DC link. The output signal 530 can have a DC component 535. The DC component 535 is depicted as relative to a center of the three phase sinusoidal signal 505. The DC component 535 can be of different magnitude relative to one or more grounds (e.g., because of a DC component of the three phase sinusoidal signal 505). The output signal 530 can have an AC component 540. For example, the AC component 540 share a fundamental frequency with the three phase sinusoidal signal 505. The AC component 540 can share a phase angle with at least one phase of the three phase sinusoidal signal 505 or can be offset therefrom. An AC component can be damped, mitigated, or removed based on the power output signal of a controller. For example, a controller can have a transfer function which strongly peaks at a same frequency as the AC component 540 (e.g., the fundamental frequency). The power output signal can be applied to the output of a circuit, such as directly or via the reference signals, a current controller, or other circuit portions. As depicted, the amplitude of the AC component of the output signal 530 can reduce over time, responsive to the application of a power output signal.

Figure 6:
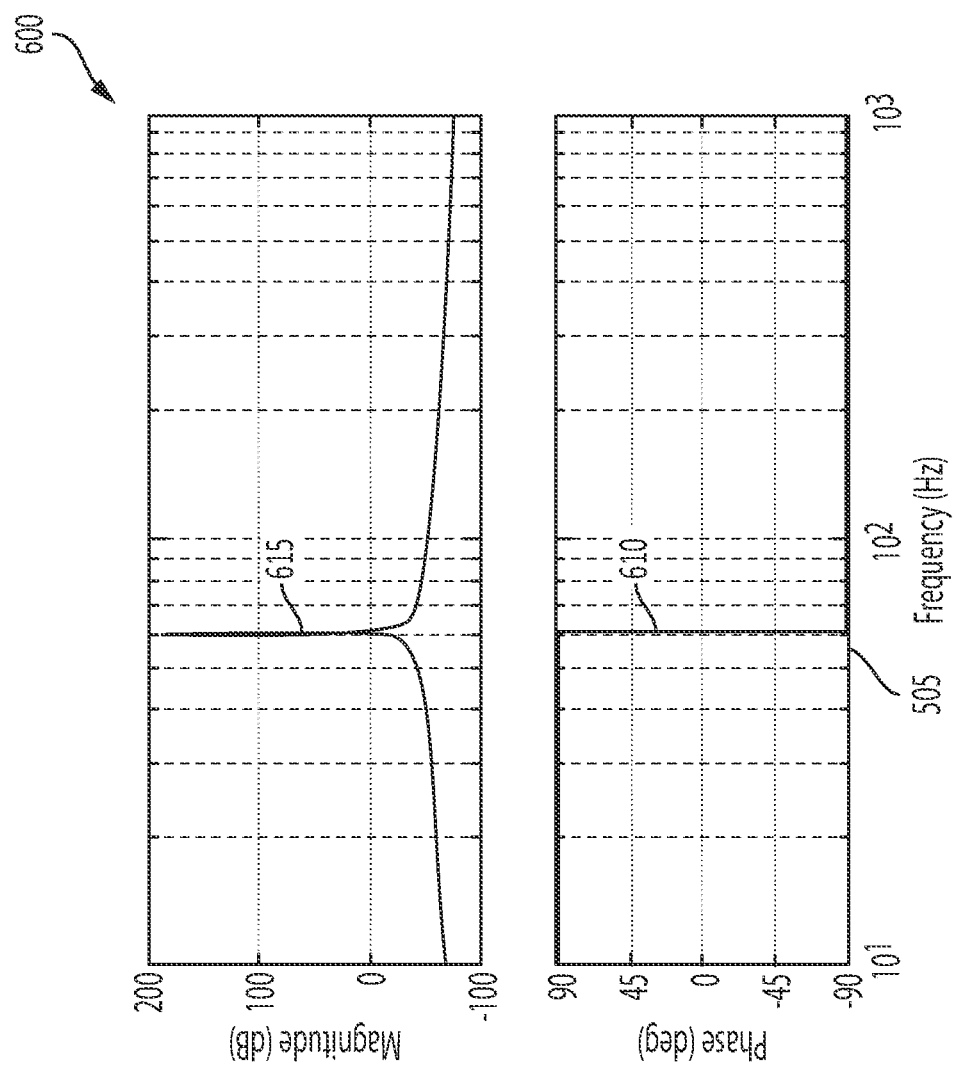
FIG. 6 is a Bode plot associated with a controller, in accordance with some aspects.
Figure 7:
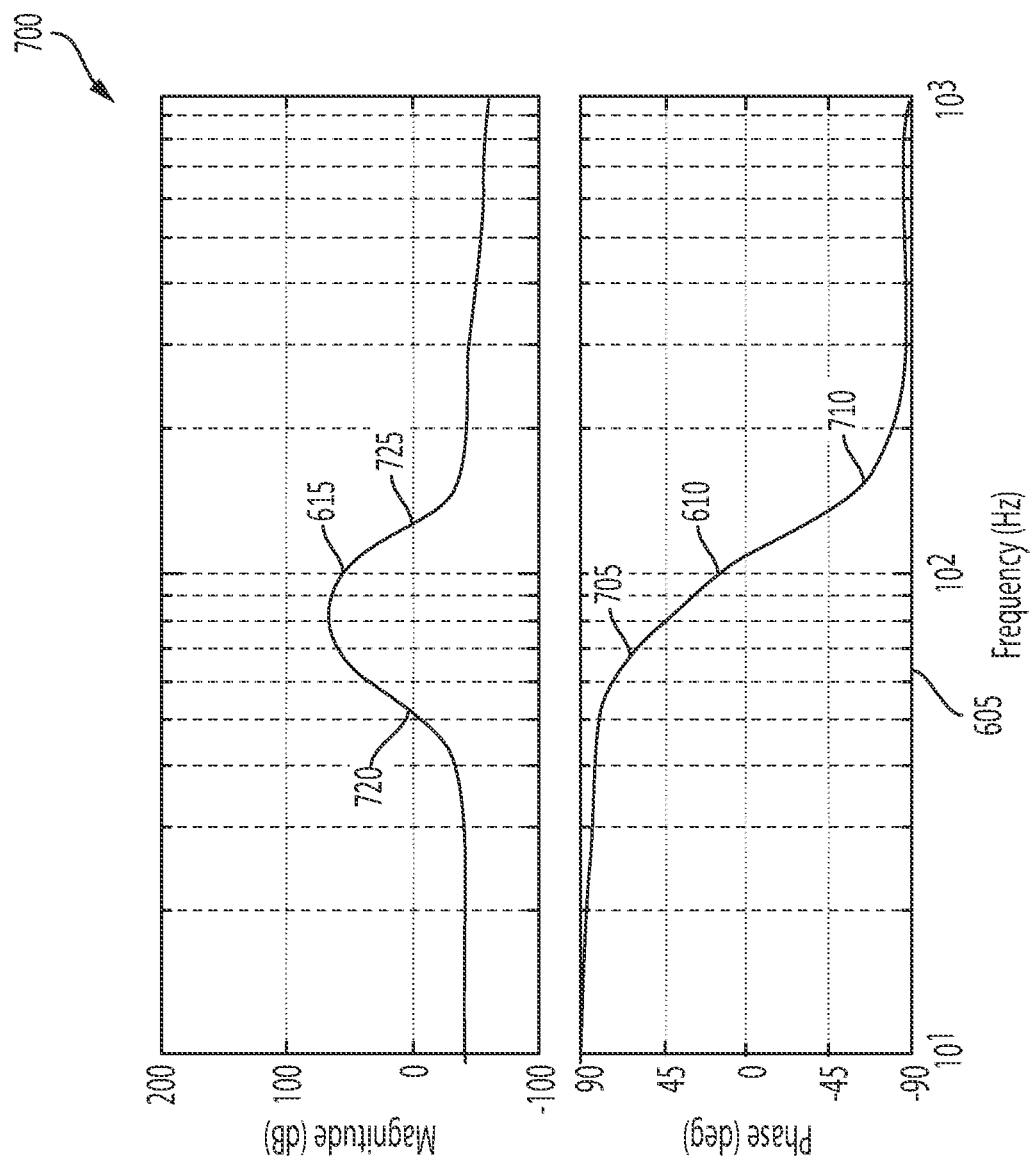
FIG. 7 is a Bode plot associated with a controller, in accordance with some aspects.

FIGS. 6 and 7 depict Bode plots associated with respective controllers, in accordance with some aspects. A Bode plot can refer to or include a plot that depicts a time-invariant frequency response of a function or device. FIG. 6 depicts a bode plot 600 of a controller having a frequency response sharply peaking at a transition frequency 605 (depicted as 60 Hz). At the transition frequency 605, the phase of the transfer function shifts 180° (e.g., inverts). The inversion slope 610 can vary (e.g., according to the bandwidth of the filter). A dominant portion 615 of the bode plot 600 can indicate a gain of greater than one. For example, the dominant portion 615 can correspond to a fundamental frequency of an input power signal 130. The dominant portion 615 can be centered around the fundamental frequency of the input power signal 630, or a harmonic or other value derivable therefrom. Various controller can exhibit various bandwidths, peak gain, symmetry or asymmetry, or other characteristics of the dominant portion 615. Circuit components (e.g., stray impedances or line inductances within the controller or another circuit portion) can affect (e.g., dampen or distort) the transfer function. For example, a circuit may not contain a power source or low-inductance line to provide a gain of a transfer function of a controller (e.g., 200 dB, 100 dB, or infinite gain). Thus, a circuit transfer function can vary from a controller transfer function.

Referring to FIG. 7, among others, some controllers can include damping (e.g., to improve a stability margin or to closer approximate a control response characteristic to a response characteristic realizable by a circuit). For example, a controller can include gain bandwidth limits, time-variant responses, or otherwise be matched to a performance of a circuit. The Bode plot 700 of FIG. 7 depicts a transition frequency 605 of about 85 Hz. The dominant portion 615 of the Bode plot 700 includes a greater bandwidth, with a lower unity crossing 720 at about 50 Hz, and an upper unity crossing 725 of about 120 Hz. Corresponding to the greater bandwidth of the dominant portion of the Bode plot 700, the slope 610 of the phase is somewhat shallower, with a lower phase roll off frequency 705 generally corresponding to the lower unity crossing 720, and an upper phase roll off frequency 710 generally corresponding to the upper unity crossing 725.

Some controllers can include a plurality of dominant portions, or a plurality of poles. For example, every pole can contain a portion exceeding unity gain. For example, a Bode plot corresponding to a di-pole, tri-pole function (and so on) can depict a transfer function of a plurality of controllers or of a controller having a frequency response at a plurality of frequencies. Some controllers can include time-variant portions which are not depicted by the Bode plots provided herein. For example, the DC gain controller 104 can include various time-variant parameters.

Figure 8:
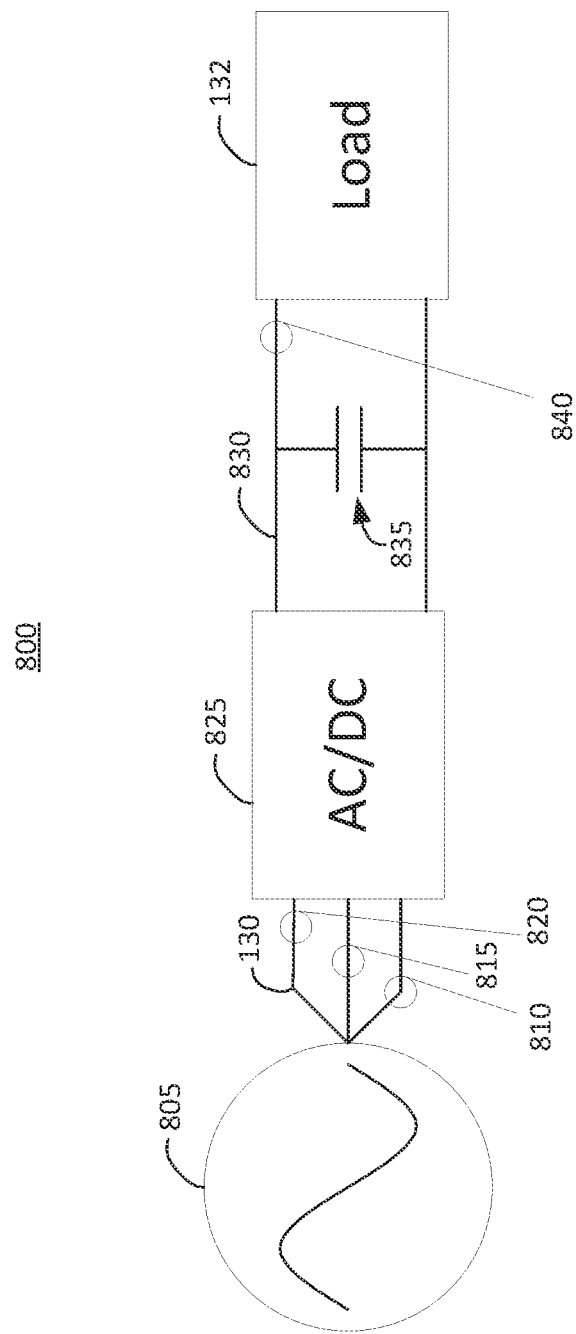
FIG. 8 depicts a circuit for supplying energy from an AC source to a DC load, in accordance with some aspects.

FIG. 8 depicts a circuit 800 for supplying energy from an AC source 805 to a DC load 132, in accordance with some aspects. The AC source 805 can be an electrical power grid, an alternator, or a generator (e.g., of an electric vehicle). For example, the AC source 805 can provide three-phase electric power. The magnitude, frequency, or other components of the AC source 805 can be variable (e.g., according to the speed of the electric vehicle or the status of an energy grid). For example, the AC source 805 can generate a multi-phase (e.g., three-phase) power output signal. The AC source 805 can generate a input power signal 130, which can be passed over one or more conductors. One or more current sensors can be associated with the one or more conductors. The input power signal 130 can be an input with respect to the AC/DC conversion circuit 825; other references to input power signals 130 may be with respect to other circuit components. A first phase current sensor 810 (e.g., a current transformer of an inner control loop) can detect a current of a first phase of the input power signal 130. A second phase current sensor 815 (e.g., a current transformer of an inner control loop) can detect a current of a second phase of the input power signal 130. A third phase current sensor 820 (e.g., a current transformer of an inner control loop) can detect a current of a third phase of the input power signal 130. The respective conductors can supply energy to an input of an AC/DC conversion circuit 825.

The output of the AC/DC conversion circuit 825 can provide DC energy to a DC link 830. The DC link 830 can include various ports (not depicted), or filtering circuits 835 such as a capacitor to condition the DC link 830. The DC link 830 can include an AC component such as a ripple coupled from the AC source 805, the load 132, or an difference between a detected AC signal and a corresponding AC signal. A DC link 830 current sensor 840 can sense a current of the DC link 830. For example, the current sensor (e.g., a hall-effect sensor or a current transformer) can sense a DC or AC component of the DC link 830. Various current sensors or frequency detection elements can be communicatively coupled with one or more controllers of the AC/DC conversion circuit 825. For example, one or more controllers of (e.g., communicatively coupled with) the AC/DC conversion circuit 825 can control the output of the AC/DC conversion circuit 825 based on the frequency, phase, or magnitude of one or more elements of the DC link 830, the input power signal 130, the load 132, or other circuit elements. The load 132 can be or include an energy grid, an electric motor, an energy storage device, and so on. The load 132 can receive energy from the DC link (e.g., through an intermediate connection). The load 132 can provide information such as power use, ripple, or other characteristics of the power input to the load 132. For example, the load 132 can include one or more current sensors.

Figure 9:
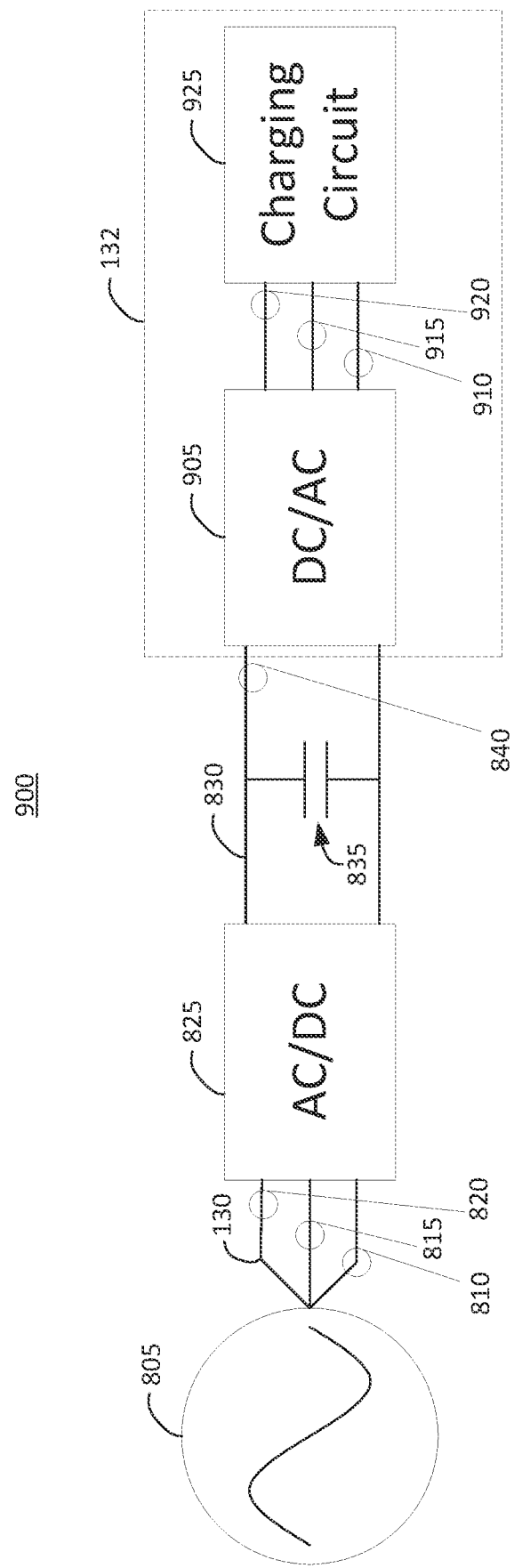
FIG. 9 depicts a circuit for supplying energy from an AC source to an AC load, in accordance with some aspects.

Referring FIG. 9, a circuit 900 for supplying energy from an AC source 805 to an AC load such as a charging circuit 925 is depicted, in accordance with some aspects. The load 132 can include a DC/AC converter 905. The DC/AC converter 905 can output a signal having a different magnitude, frequency, number of phases, phase angle, or so on, relative to the signal supplied by the AC source 805. For example, the load 132 can include one or more current sensors on one or more conductors or phases. The load 132 can include a first current transformer 910, a second current transformer 915, and a third current transformer 920 coupled to respective conductors or phases of an AC signal. The load 132 can include a charging circuit, such as a circuit to charge an energy storage device, such as a battery (e.g., for an electric vehicle or grid scale storage), a drive unit such as an electric motor, or an energy grid.

Figure 10:
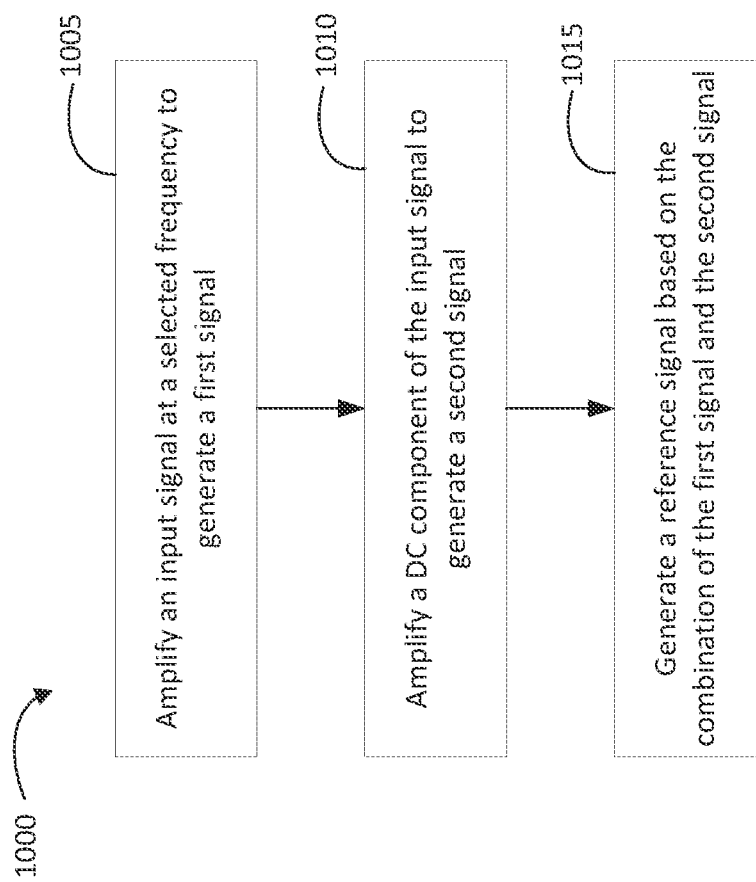
FIG. 10 is a flow diagram for a method to compensate for a current sensor, in accordance with some aspects.

FIG. 10 is a flow diagram for a method 1000 to compensate for a current sensor, in accordance with some aspects. The method 1000 can be performed by one or more components or systems depicted in FIGS. 1-4 or 8-9 including, for example, a charger 102. At ACT 1005, one or more controllers amplify an input signal at a selected frequency to generate a first signal. For example, the frequency can be a detected frequency of a sinusoidal signal, such as 60 Hz. The one or more controllers can amplify various frequencies. For example, the controllers can amplify signals at 120 Hz or between 59 Hz and 61 Hz according to a transfer function providing peak amplification at frequency of 60 Hz. For example, the controllers can include a PR controller of an outer control loop to provide an output to reduce a magnitude of an error signal.

At ACT 1010, the one or more controllers can amplify a DC component of the input signal to generate a second signal. For example, the DC component can be a variance from a set point. For example, a voltage level can be adjusted upward or downward according to one or more damping parameters 124. The controller can amplify an inverted error signal such that the output of the one or more controllers causes an output which reduces a magnitude of the error signal.

At ACT 1015, a reference signal is generated based at least in part on the combination of the first and second signals. For example, the signals can be resolved to a same domain (e.g., the time domain) to provide a signal output which includes the first and second signal. For example, a first signal can be or include a 60 Hz sine wave, and the second signal can include a combination of sinusoidal signals to adjust a DC component. The reference signal can be applied to reduce a magnitude of an error signal, such as by applying the reference signal to an inner control loop.

Figure 11:
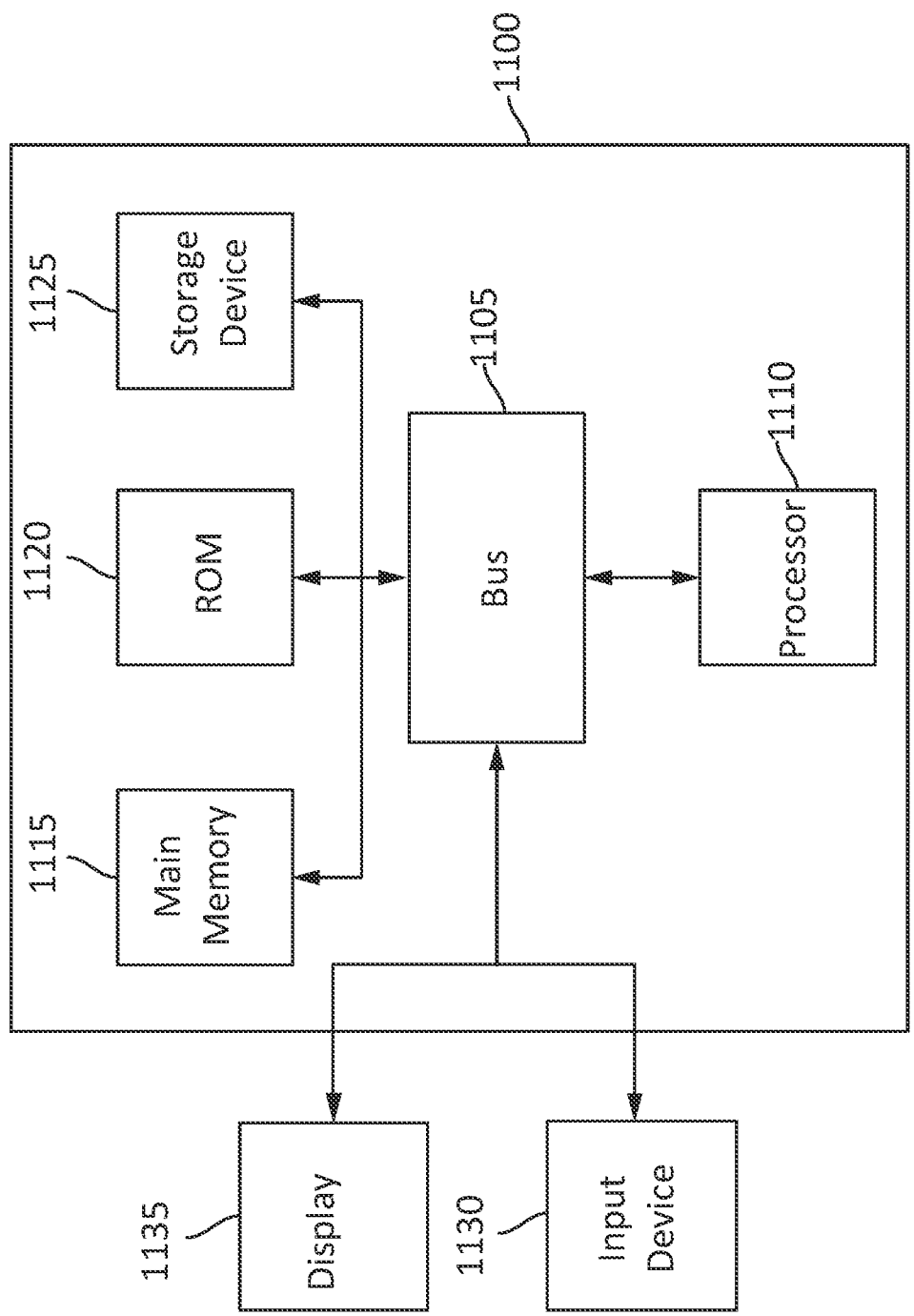
FIG. 11 is a block diagram illustrating an architecture for a computer system that can be employed to implement elements of the systems and methods described and illustrated herein.

FIG. 11 depicts an example block diagram of an example computer system 1100. The computer system or computing device 1100 can include or be used to implement a data processing system or its components, such as the charger 102 and components thereof. The computing system 1100 includes at least one bus 1105 or other communication component for communicating information (e.g., within the charger 102 or between the charger 102 and a devices associated with the load 132 or input power signal 130) and at least one processor 1110 or processing circuit coupled to the bus 1105 for processing information. The computing system 1100 can also include one or more processors 1110 or processing circuits coupled to the bus for processing information. The computing system 1100 also includes at least one main memory 1115, such as a random access memory (RAM) or other dynamic storage device, coupled to the bus 1105 for storing information, and instructions to be executed by the processor 1110. The main memory 1115 can be used for storing information during execution of instructions by the processor 1110. The computing system 1100 may further include at least one read only memory (ROM) 1120 or other static storage device coupled to the bus 1105 for storing static information and instructions for the processor 1110. A storage device 1125, such as a solid state device, magnetic disk or optical disk, can be coupled to the bus 1105 to persistently store information and instructions.

The computing system 1100 may be coupled via the bus 1105 to a display 1135, such as a liquid crystal display, or active matrix display, for displaying information to a user such as a driver of the electric vehicle or other end user. An input device 1130, such as a keyboard or voice interface may be coupled to the bus 1105 for communicating information and commands to the processor 1110. The input device 1130 can include a touch screen display 1135. The input device 1130 can also include a frequency selection, power selection, or charging time selection, for communicating direction information and command selections to the processor 1110 and for controlling cursor movement on the display 1135.

The processes, systems and methods described herein can be implemented by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. Hard-wired circuitry can be used in place of or in combination with software instructions together with the systems and methods described herein. Systems and methods described herein are not limited to any specific combination of hardware circuitry and software.

Although an example computing system has been described in FIG. 11, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, gain referred to herein can be a positive or negative gain. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system to convert alternating current (AC) power to direct current (DC) power to charge an electric vehicle, comprising:
   one or more voltage controllers of a charger, the one or more voltage controllers configured to amplify an input signal at a first selected frequency to generate a first signal, and to amplify a direct current component of the input signal to generate a second signal; and
   a first component of the charger configured to generate, based at least in part on a combination of the first signal and the second signal, a first reference signal for input into one or more current controllers of the charger; and
   one or more current sensors to generate a second reference signal for input into the one or more current controllers based on a value of current of an AC input current into the charger; and wherein
   the input signal comprises a voltage of a DC link of the charger.

2. The system of claim 1, wherein the one or more current sensors include at least three current sensors, each of the at least three current sensors corresponding to a phase of the AC input current into the charger.

3. The system of claim 1, comprising:
   the one or more voltage controllers to amplify the input signal at the first selected frequency with a gain greater than 10, wherein the first selected frequency is greater than zero;
   the one or more voltage controllers to amplify the input signal at a second selected frequency to generate a third signal, wherein the second selected frequency is twice the first selected frequency; and
   the first component to generate the first reference signal based at least in part on the first signal, the second signal, and the third signal.

4. The system of claim 1, comprising:
   the one or more voltage controllers to amplify the input signal at a second selected frequency to generate a third signal; and
   the first component to generate the first reference signal based at least in part on the first signal, the second signal, and the third signal.

5. The system of claim 1, wherein a first voltage controller of the one or more voltage controllers is configured to amplify the input signal at a first frequency to generate the first signal, one or more of the current sensors is configured to detect the direct current component of the input signal, and a second voltage controller of the one or more voltage controllers is configured to amplify the direct current component of the input signal to generate the second signal.

6. The system of claim 1, wherein the one or more voltage controllers comprise:
   a proportional resonance controller configured to amplify the input signal to generate the first signal; and
   a proportional integral controller configured to amplify the input signal to generate the second signal.

7. The system of claim 1, comprising:
   a combiner component configured to combine the first signal and the second signal to generate a third signal to provide to the first component to generate the first reference signal.

8. The system of claim 1, comprising the charger to:
   detect a fundamental frequency and phase angle of the input signal; and
   select the first selected frequency based at least in part on the fundamental frequency.

9. The system of claim 1, wherein the first reference signal causes a current limit to be applied to a signal of the DC link.

10. The system of claim 1, comprising the charger to:
    receive the input signal from a power grid; and
    provide, based at least in part on the first reference signal, an output signal to charge the electric vehicle.

11. The system of claim 1, wherein the one or more current sensors comprise:
    a current sensor that detects only an AC component to detect an amplitude or a phase angle of the AC input current into the charger.

12. A method, comprising:
    amplifying, by one or more voltage controllers of a charger for an electric vehicle, an input signal at a first selected frequency to generate a first signal;
    amplifying, by the one or more voltage controllers, a direct current component of the input signal to generate a second signal;
    generating, by a first component of the charger, based at least in part on a combination of the first signal and the second signal, a first reference signal for input into one or more current controllers of the charger; and generating, by one or more current sensors, a second reference signal for input into the one or more current controllers; and wherein the input signal is a voltage of a DC link of the charger.

13. The method of claim 12, wherein the one or more current sensors include at least three current sensors, each of the at least three current sensors corresponding to a respective phase of an AC input current into the charger, and wherein each of the current sensors detects an alternating current component and does not detect a direct current component.

14. The method of claim 12, comprising:
amplifying, by the one or more voltage controllers, the input signal at a second selected frequency to generate a third signal, wherein:
a gain of the amplification of the first signal is greater than 10;
the first selected frequency is greater than zero;
the second selected frequency is twice the first selected frequency; and
the first reference signal is based at least in part on the first signal, the second signal, and the third signal.

15. The method of claim 12, comprising:
amplifying, by the one or more voltage controllers, the input signal at a second selected frequency to generate a third signal, wherein the second selected frequency is twice the first selected frequency; and
generating, by the first component, the first reference signal based at least in part on the first signal, the second signal, and the third signal.

16. The method of claim 12, wherein the one or more voltage controllers comprise a first voltage controller and a second voltage controller that is different from the first voltage controller, the method comprising:
amplifying, by the first voltage controller of the one or more voltage controllers, the input signal to generate the first signal; and
amplifying, by the second voltage controller of the one or more voltage controllers, the direct current component of the input signal to generate the second signal.

17. The method of claim 12, wherein the one or more voltage controllers comprise a proportional resonance controller and a proportional integral controller, the method comprising:
amplifying, by the proportional resonance controller of the one or more voltage controllers, the input signal to generate the first signal; and
amplifying, by the proportional integral controller of the one or more voltage controllers, the input signal to generate the second signal.

18. A system, comprising:
a charger for an electric vehicle, the charger comprising:
a first voltage controller to convert an input power signal to a first output power signal with a gain greater than 1 at a first selected frequency;
a second voltage controller to convert a direct current component of the input power signal to a second output power signal with a gain greater than 1;
a combiner to combine the first output power signal with the second output power signal to generate a third output power signal to provide a first reference signal for input into one or more current controllers of the charger; and
a current transformer to generate a second reference signal for input into the one or more current controllers.

19. The system of claim 18, comprising:
the first voltage controller to convert the input power signal to a fourth output power signal with a gain greater than 10 at second selected frequency that is at least twice the first selected frequency; and
the combiner to combine the fourth output power signal with at least one of the first output power signal or the second output power signal to generate the third output power signal.

20. The system of claim 18, comprising the charger to:
detect a fundamental frequency of the input power signal; and
set the first selected frequency based at least in part on the fundamental frequency.

* * * * *